US011526862B2

(12) United States Patent
Liberti (10) Patent No.: US 11,526,862 B2
(45) Date of Patent: Dec. 13, 2022

(54) INTERACTIVE INFORMATION TECHNOLOGY KIOSK

(71) Applicant: HUMANTOUCH, LLC, McLean, VA (US)

(72) Inventor: William Liberti, McLean, VA (US)

(73) Assignee: HUMANTOUCH, LLC, McLean, VA (US)

(*) Notice: Subject to any disclaimer, the term of this patent is extended or adjusted under 35 U.S.C. 154(b) by 0 days.

(21) Appl. No.: 17/165,850

(22) Filed: Feb. 2, 2021

(65) Prior Publication Data

US 2021/0241246 A1 Aug. 5, 2021

Related U.S. Application Data

(60) Provisional application No. 62/969,955, filed on Feb. 4, 2020.

(51) Int. Cl.
*G06Q 20/18* (2012.01)
*G06Q 10/00* (2012.01)
(Continued)

(52) U.S. Cl.
CPC ............ *G06Q 20/18* (2013.01); *G06N 20/00* (2019.01); *G06Q 10/20* (2013.01); *G06Q 30/012* (2013.01)

(58) Field of Classification Search
CPC ...... G06Q 20/18; G06Q 10/20; G06Q 30/012; G06N 20/00

(Continued)

(56) References Cited

U.S. PATENT DOCUMENTS 5,774,663 A 6/1998 Randle et al.
10,929,261 B1\* 2/2021 Levin .................... H04L 67/125
(Continued)

FOREIGN PATENT DOCUMENTS

CN 108922614 A 11/2018
JP 2006-209194 A 8/2006
WO WO 2017/172933 A1 10/2017

OTHER PUBLICATIONS

Interactive Kiosk—Wikipedia, downloaded from https://en.wikipedia.org/wiki/Interactive_kiosk. Page last edited on Jan. 1, 2021.
(Continued)

*Primary Examiner* — Daniel A Hess
(74) *Attorney, Agent, or Firm* — Squire Patton Boggs (US) LLP (57) ABSTRACT

Certain example embodiments provide systems, methods, apparatuses, and computer program products for an interactive information technology (IT) kiosk that can be used to access IT services (e.g., live IT services) for computing hardware. For example, the interactive IT kiosk may include various ports for connecting computing hardware to establish a connection to a service center and/or to provide diagnostic data to the service center, a video camera, a display screen (e.g., a touchscreen display), a microphone, and/or the like. These hardware components may allow for a service center to provide IT services related to the computing hardware in real-time and may allow for real-time communication with a user of the interactive IT kiosk without consuming additional computing resources of the computing hardware.

20 Claims, 9 Drawing Sheets

(51) Int. Cl.
    *G06N 20/00*     (2019.01)
    *G06Q 30/00*     (2012.01)

(58) Field of Classification Search
    USPC .......................................................... 235/383
    See application file for complete search history.

(56) References Cited

U.S. PATENT DOCUMENTS

| | | |
|---|---|---|
| 2013/0191170 A1 | 7/2013 | Jarrett et al. |
| 2015/0145642 A1 | 5/2015 | Rutledge et al. |
| 2016/0098688 A1 | 4/2016 | Hunt et al. |
| 2019/0156611 A1 | 5/2019 | Redhead et al. |
| 2021/0304559 A1* | 9/2021 | Cupersmith ........... B25J 19/023 |
| 2022/0005083 A1* | 1/2022 | Patterson ............... G06Q 10/20 |

OTHER PUBLICATIONS

Kiosk—Wikipedia, downloaded from https://en.wikipedia.org/wiki/Kiosk. Page last edited on Dec. 22, 2020.
Courtney Linder, "This Robotic Arm Can Lend a Helping Hand with Repairs," Popular Mechanics, Nov. 17, 2019. Downloaded from https://www.popularmechanics.com/technology/robots/a29712497/robot-repair-arm/.
Albert Huang et al., "Kimono: Kiosk-Mobile Phone Knowledge Sharing System," Jul. 31, 2020, URL: http://people.csail.mit.edu/kapu/papers/huang_mum05.pdf.

* cited by examiner

INTERACTIVE INFORMATION TECHNOLOGY KIOSK

CROSS-REFERENCE TO RELATED APPLICATION

This application claims the benefit of U.S. Provisional patent Application No. 62/969,955, filed Feb. 4, 2020, the content of which is incorporated by reference herein in its entirety.

FIELD

Some example embodiments may generally relate to kiosks, and more particularly to an interactive information technology (IT) kiosk.

BACKGROUND

An interactive kiosk may include a computer terminal featuring specialized hardware and software that provides access to information and applications in various contexts. Example kiosks include instant print stations, ticketing kiosks, and visitor management and security kiosks.

SUMMARY

According to a first embodiment, a method may comprise receiving, by an interactive information technology kiosk, information comprising a user of the interactive information technology kiosk or one or more issues experienced by one or more computing devices. The method may comprise establishing, via one or more ports, one or more connections with the one or more computing devices. The method may comprise determining one or more individuals associated with a service center to provide one or more information technology services to the one or more computing devices based at least on the information. The method may comprise establishing one or more connections with one or more workstations associated with the one or more individuals. The method may comprise providing one or more multimedia services related to the one or more information technology services after establishing the one or more connections.

In a variant, the method may further comprise performing one or more diagnostic tests of the one or more computing devices via the one or more ports. In a variant, the method may further comprise processing the information or one or more results of the one or more diagnostic tests using an artificial intelligence or a machine learning model to identify one or more characteristics of the information or the one or more results of the one or more diagnostic tests. In a variant, the method may comprise matching the one or more individuals to the one or more computing devices based on the one or more characteristics of the information or the one or more results. In a variant, the interactive information technology kiosk may comprise at least one of a frame, one or more displays, one or more video cameras, one or more platforms for the computing device, one or more microphones, or one or more speakers. In a variant, the one or more computing devices may comprise one or more personal computers, one or more medical devices, one or more industrial tools, or one or more elements of a vehicle or a machine. In a variant, the one or more ports may comprise at least one of one or more universal serial bus ports, one or more Ethernet ports, or one or more multiple pin ports. In a variant, the one or more multimedia services may comprise at least one of one or more audio services, one or more video services, or one or more augmented reality services. In a variant, the receiving of the information may comprise receiving the information via at least one of one or more user interfaces, one or more microphones, one or more video cameras, or one or more electronic drawing pads. Furthermore, any one or more other aspects described herein may be included in the first embodiment or may be a variant of the first embodiment.

According to a second embodiment, an interactive information technology kiosk may comprise at least one processor, and at least one memory comprising computer program code. The at least one memory and the computer program code may be configured to, with the at least one processor, cause the interactive information technology kiosk at least to receive information comprising a user of the interactive information technology kiosk or one or more issues experienced by one or more computing devices. The at least one memory and the computer program code may be configured to, with the at least one processor, cause the interactive information technology kiosk at least to establish, via one or more ports, one or more connections with the one or more computing device. The at least one memory and the computer program code may be configured to, with the at least one processor, cause the interactive information technology kiosk at least to determine one or more individuals associated with a service center to provide one or more information technology services to the one or more computing devices based at least on the information. The at least one memory and the computer program code may be configured to, with the at least one processor, cause the interactive information technology kiosk at least to establish one or more connections with one or more workstations associated with the one or more individuals. The at least one memory and the computer program code may be configured to, with the at least one processor, cause the interactive information technology kiosk at least to provide one or more multimedia services related to the one or more information technology services after establishing the one or more connections.

In a variant, the at least one memory and the computer program code may be configured to, with the at least one processor, further cause the interactive information technology kiosk at least to perform one or more diagnostic tests of the one or more computing devices via the one or more ports. In a variant, the at least one memory and the computer program code may be configured to, with the at least one processor, further cause the interactive information technology kiosk at least to process the information or one or more results of the one or more diagnostic tests using an artificial intelligence or a machine learning model to identify one or more characteristics of the information or the one or more results of the one or more diagnostic tests. In a variant, the at least one memory and the computer program code may be configured to, with the at least one processor, further cause the interactive information technology kiosk at least to match the one or more individuals to the one or more computing devices based on the one or more characteristics of the information or the one or more results.

In a variant, the interactive information technology kiosk may further comprise at least one of a frame, one or more displays, one or more video cameras, one or more platforms for the computing device, one or more microphones, or one or more speakers. In a variant, the one or more computing devices may comprise one or more personal computers, one or more medical devices, one or more industrial tools, or one or more elements of a vehicle or a machine. In a variant, the one or more ports may comprise at least one of one or more universal serial bus ports, one or more Ethernet ports, or one or more multiple pin ports. In a variant, the one or more multimedia services may comprise at least one of one or more audio services, one or more video services, or one or more augmented reality services. In a variant, the at least one memory and the computer program code may be configured to, with the at least one processor, further cause the interactive information technology kiosk, when receiving the information, at least to receive the information via at least one of one or more user interfaces, one or more microphones, one or more video cameras, or one or more electronic drawing pads. Furthermore, any one or more other aspects described herein may be included in the second embodiment or may be a variant of the second embodiment.

According to a third embodiment, an interactive information technology kiosk may comprise a set of components comprising a frame, at least one processor, at least one memory comprising computer program code, one or more ports, one or more displays, one or more video cameras, one or more platforms for the computing device, one or more microphones, and one or more speakers. The set of components may be configured to receive information comprising a user of the interactive information technology kiosk or one or more issues experienced by one or more computing devices. The set of components may be configured to determine one or more individuals associated with a service center to provide one or more information technology services to the one or more computing devices based at least on the information.

In a variant, the set of components may be further configured to establish, via the one or more ports, one or more connections with the one or more computing devices after receiving the information, establish one or more connections with one or more workstations associated with the one or more individuals after determining the one or more individuals, and provide one or more multimedia services related to the one or more information technology services after establishing the one or more connections. Furthermore, any one or more other aspects described herein may be included in the third embodiment or may be a variant of the third embodiment.

A fourth embodiment may be directed to an apparatus that may include circuitry configured to cause the apparatus to perform the method according to the first embodiment, to perform the operations of the second or third embodiments, or may be included in the interactive information technology kiosk of the second or third embodiments, or any of the variants discussed above.

A fifth embodiment may be directed to an apparatus that may include means for performing the method according to the first embodiment, or the operations of the second or third embodiments, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment, to perform the operations of the second or the third embodiments, or any of the variants discussed above.

A seventh embodiment may be directed to a computer program product encoding instructions for causing an apparatus to perform at least the method according to the first embodiment, the operations of the second or third embodiments, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for an interactive IT kiosk is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Some organizations use on-site IT services provided by on-site IT professionals. These IT professionals provide a variety of IT-related services for computer hardware and software. However, even with on-site IT services, there may not be enough personnel to handle IT issues due to volume, time of day, day of the week, type of issue, etc., which increases downtime for computing hardware or software or increases the amount of time between occurrence of an issue related to computing hardware or software and remedying the issue. Some organizations use off-site IT services provided by off-site IT professionals through a service center to provide increased coverage of IT services in terms of hours of service, type of service, and location of service. However, these types of services often require submission of an issue ticket that gets queued with dozens or hundreds of other issue tickets, resulting in significant delay in remedying computing issues. Furthermore, although off-site IT professionals can remotely access computer hardware or software, a user of that hardware or software may need to use conferencing software installed on the computing device, a separate telephone, or the like to communicate with the IT professional as the services are being provided. This consumes excess processing and/or computing resources of the computing device and/or may not be possible depending on the computing issue or use scenario.

Figure 1:
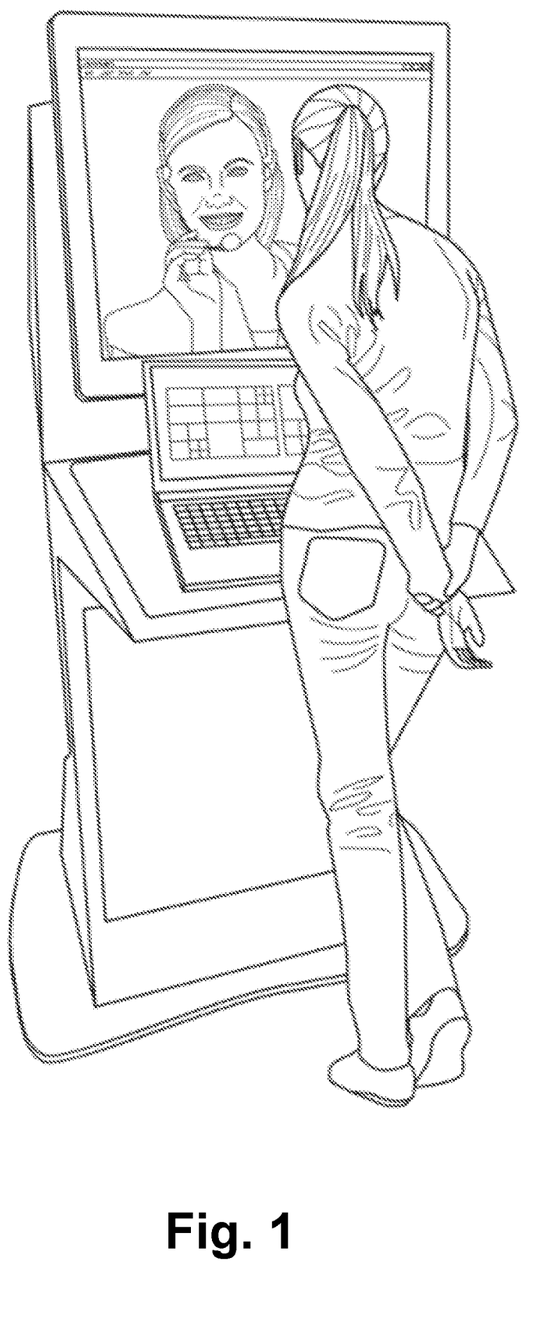
FIG. 1 illustrates an example interactive IT kiosk, according to some embodiments.

Some embodiments described herein may provide an interactive IT kiosk, such as the interactive IT kiosk illustrated in FIG. 1, that can be used to access IT services (e.g., live IT services) for computing devices. For example, the interactive IT kiosk may include various ports for connecting computing device to establish a connection to a service center and/or to provide diagnostic data to the service center, a video camera, a display screen (e.g., a touchscreen display), a microphone, and/or the like. These hardware components may allow for a service center to provide IT services related to the computing device in real-time or near real-time and may allow for real-time or near real-time communication with a user of the interactive IT kiosk without consuming additional computing resources of the computing device.

Furthermore, certain embodiments may provide a dynamic and intelligent matching of an IT professional for providing IT services (an IT professional may include any individual that provides IT services via the interactive IT kiosk 202). For example, a user of the interactive IT kiosk may input information into the interactive IT kiosk regarding a computing issue experienced at the computing device and may connect the computing device to various ports of the interactive IT kiosk. Based on diagnostic information gathered from the ports or the information input to the interactive IT kiosk, a matching system may identify a particular IT professional to provide IT services to the computing device (e.g., using a machine learning model). In this way, certain embodiments may enable faster and more tailored provisioning of IT services, which reduces downtime for computing devices compared to traditional IT services, reduces or eliminates consumption of computing resources of the computing devices in connection with provisioning of IT services, and/or improves matching of computing devices to IT service professionals based on the particular issues being experienced by the computing devices.

Figure 2:
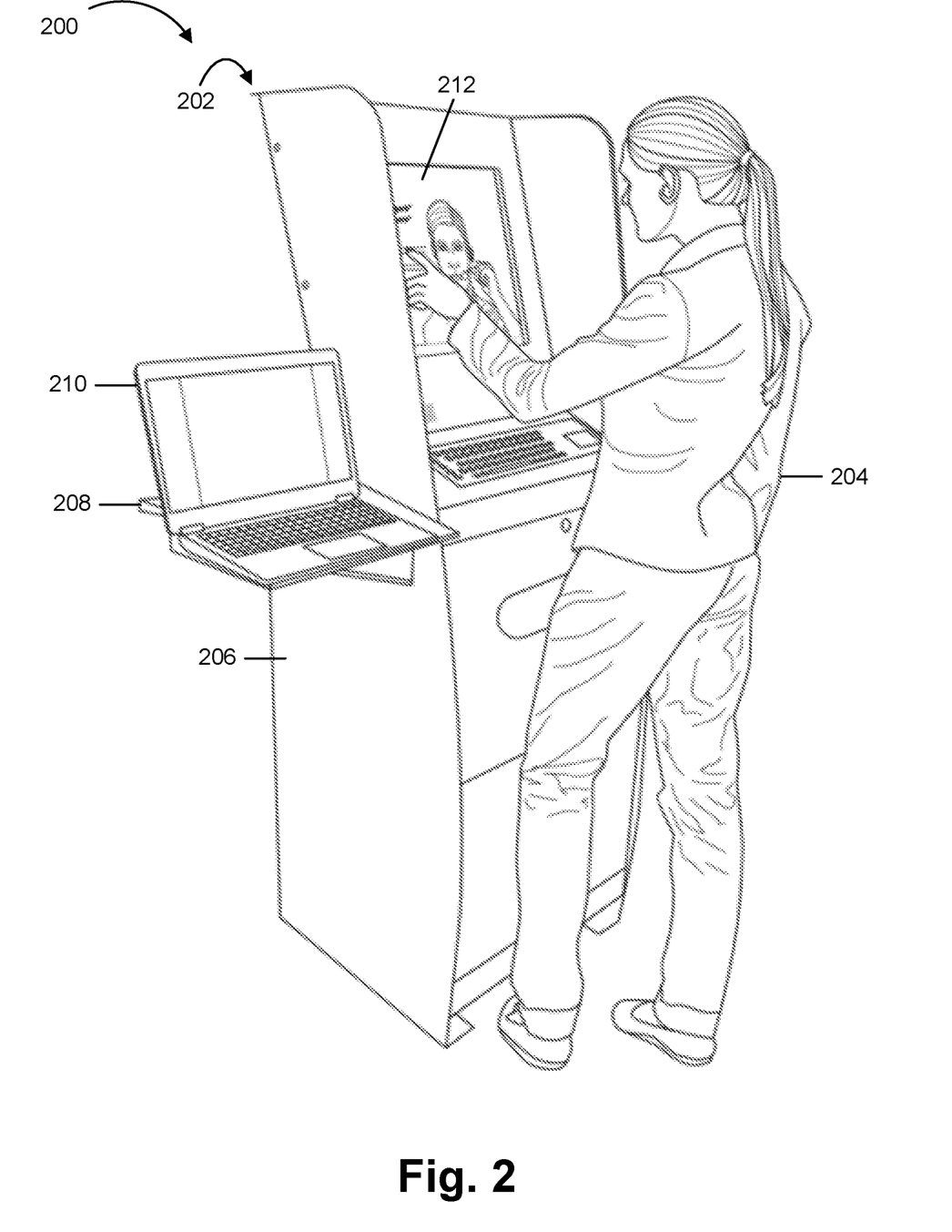
FIG. 2 illustrates another example of an interactive IT kiosk, according to some embodiments.

FIG. 2 illustrates another example 200 of an interactive IT kiosk, according to some embodiments. As illustrated in FIG. 2, the example 200 includes an interactive IT kiosk 202 and a user 204 of the interactive IT kiosk 202. The interactive IT kiosk 202 may include a frame 206 that may house or mechanically support other components of the interactive IT kiosk 202 and/or to which other components of the interactive IT kiosk 202 may be mounted. The frame 206 may include elements formed from plastic, metal, or a variety of other suitable materials. In the example 200, the interactive IT kiosk 202 is stationary, but the interactive IT kiosk 202 may be mobile in other embodiments.

As further illustrated in FIG. 2, a part of the frame of the interactive IT kiosk 202 may include a platform 208 on which computing device 210 may be placed or which may include one or more ports for connecting to the computing device 210 (and which may be adjustable in terms of height off the ground, angle with respect to other portions of the frame 206, and/or the like). The platform 208 may include one or more components, such as a barcode scanner, a near-field communication reader, or the like, to gather information from the computing device 210 when placed on the platform 208. This information may be used by the interactive IT kiosk 202 to obtain records (e.g., from a data structure stored in memory of the interactive IT kiosk 202 or another device) related to the computing device 210 and/or an account associated with the computing device 210, which the interactive IT kiosk 202 may use to predict an issue with the computing device 210, to identify previous IT services or solutions provided to the computing device 210, to determine an IT professional that previously provided IT services to the computing device 210, and/or the like. In the example 200, the computing device 210 is a laptop computer. However, the interactive IT kiosk 202 can be used in a variety of deployment contexts, and the computing device 210 may include a medical device, an industrial tool (e.g., a drill, a probe, etc.), an element of a vehicle or machine that includes computing hardware (e.g., an automobile part that includes one or more sensors and/or chips), and/or the like. In addition, the interactive IT kiosk 202 may include a display 212 (e.g., a touchscreen display). The interactive IT kiosk 202 may further include a microphone, speakers, a video camera, a keyboard, a mouse, ports (e.g., a universal serial bus (USB) port, an Ethernet port, a multiple pin port, a lightning port, a video graphics array (VGA) port, a keyboard/video/mouse (KVM) port, etc.), and/or the like to be used in controlling the interactive IT kiosk 202, controlling the services provided to the computing device 210, communicating with an IT professional, and/or the like. Furthermore, interactive IT kiosk 202 may include components that facilitate various deployment scenarios, such as a battery or solar panels so that the interactive IT kiosk 202 can be deployed to a location without access to an electrical grid, satellite antenna(s) so that the interactive IT kiosk 202 can be deployed to a location without cellular or cable network access, and/or the like. Additionally, or alternatively, the interactive IT kiosk 202 may include robotic components (e.g., robotic arms) that can be controlled by a remote technician to perform an IT service on the computing device 210.

Additionally, or alternatively, the interactive IT kiosk 202 may include a secure compartment into which the computing device 210 can be deposited, where one or more scanners (e.g., bar code or quick response (QR) code scanners, radio frequency identifier (RFID) scanners, etc.) can identify the computing device 210, an account associated with the computing device 210, and/or the like. The interactive IT kiosk 202 may then output a replacement computing device via the same compartment or a different compartment from an inventory of computing devices 210 and may store a log identifying the newly issued computing device 210 (e.g., using the one or more scanners to identify the replacement computing device). For example, the user 204 may deposit a mobile phone into the interactive IT kiosk 202, and the interactive IT kiosk 202 may output a new mobile phone issued to the user 204.

As described above, FIG. 2 is provided as an example. Other examples are possible, according to some embodiments.

Figure 3:
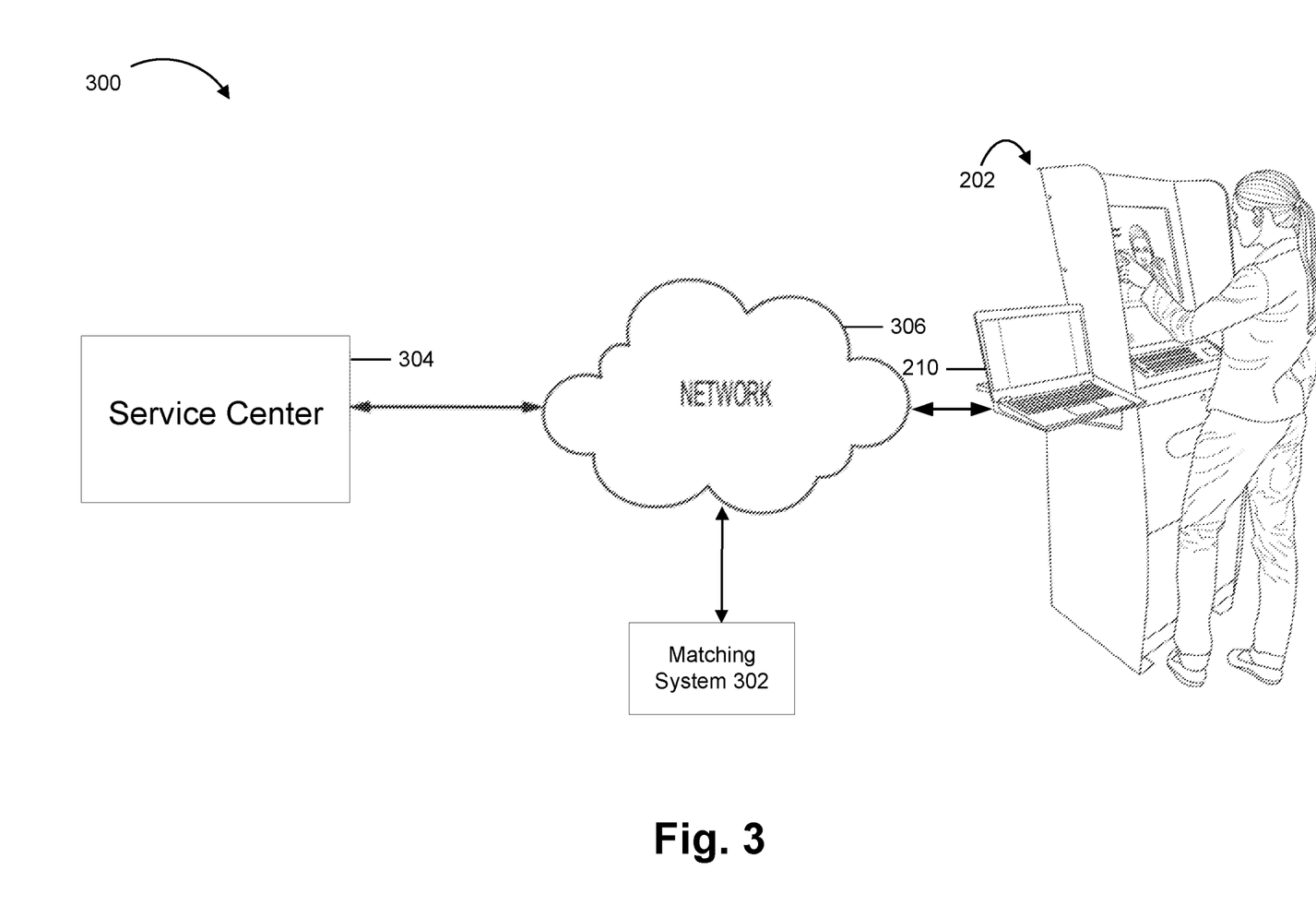
FIG. 3 illustrates an example of a system that includes an interactive IT kiosk, according to some embodiments.

FIG. 3 illustrates an example 300 of a system that includes an interactive IT kiosk, according to some embodiments. As illustrated in FIG. 3, the example 300 includes the interactive IT kiosk 202, a matching system 302, a service center 304, and a network 306.

The interactive IT kiosk 202 may be similar to that described with respect to FIG. 2. The matching system 302 may include one or more computing devices (e.g., servers). In some embodiments, the matching system 302 may be hosted in a data center, at the service center 304, and/or on a computing device installed in the interactive IT kiosk 202. The matching system 302 may receive information related to a computing device (e.g., computing device 210 of FIG. 2) to which IT services are to be provided and/or issues experienced by the computing device. An IT service may include technical troubleshooting, software or firmware updating, application-specific assistance, and/or the like. The matching system 302 may process the received information using a machine learning model to identify characteristics of IT needs related to the computing device. Based on this identification, the matching system 302 may, using the machine learning model, identify an IT professional to provide IT services to the computing device. The matching system 302 may then provide instructions to a computing station of the IT professional to connect to the interactive IT kiosk 202 to establish a connection between the computing station and the interactive IT kiosk 202 and/or the computing device to receive the IT services. In addition, the matching system 302 may provide personal information related to a user of the interactive IT kiosk 202, such as name, title, employee number, and/or the like. These and other aspects of the matching system 302 are described in more detail elsewhere herein.

The service center 304 may include one or more work stations (e.g., that include desktop or laptop computers, telephones, headsets, video cameras, and/or the like). IT professionals may use the one or more work stations to provide IT services to a computing device connected to the interactive IT kiosk 202. The network 306 may include one or more wired or wireless networks via which the interactive IT kiosk 202, the matching system 302, and the service center 304 may communicate. For example, the network 306 may include the Internet, an intranet, a cellular network (e.g., a 3G network, a 4G network, or a 5G network), a public mobile land network (PLMN), and/or the like. Network 306 may be encrypted or may employ end-to-end security between the service center 304 and the interactive IT kiosk 202. In this way, interactive IT kiosk 202 is capable of operating with existing networks. In addition, the interactive IT kiosk 202 may include backup network connections, including cellular communications.

As indicated above, FIG. 3 is provided as an example. Other examples are possible, according to some embodiments.

Figure 4A:
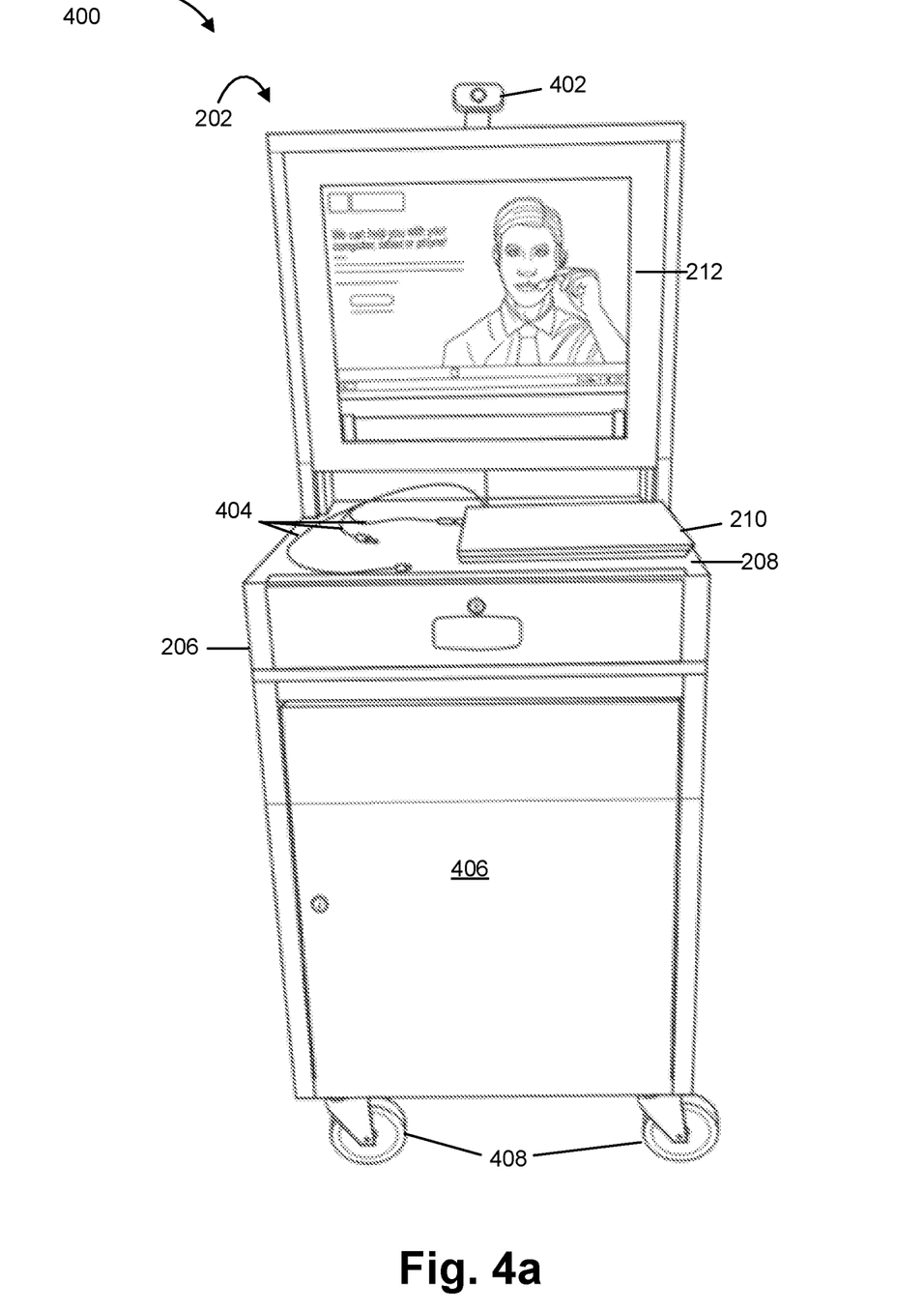
FIGS. 4a and 4b illustrate various views of an example of an interactive IT kiosk, according to some embodiments.
Figure 4B:
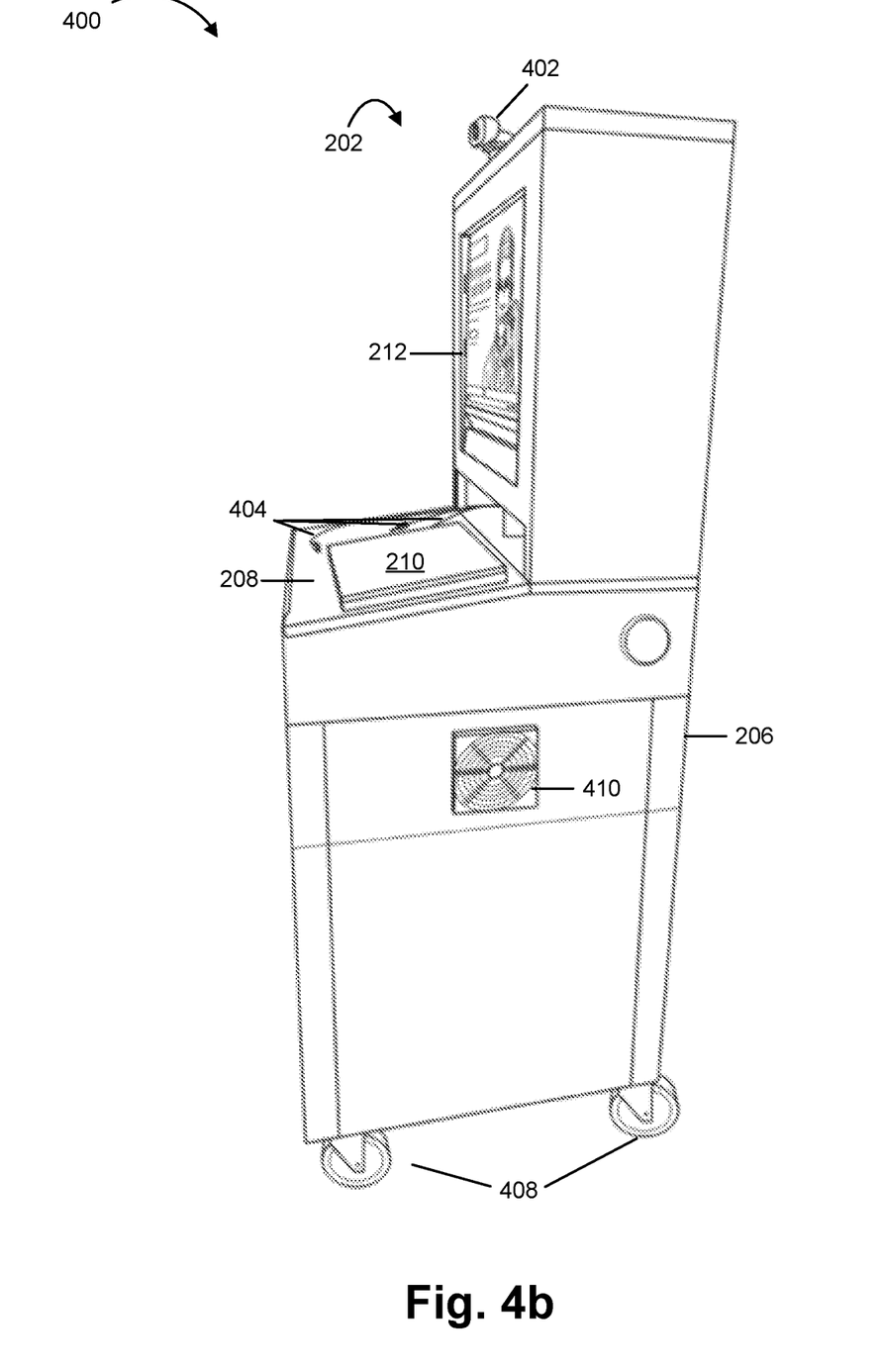

FIGS. 4a and 4b illustrate various views of an example 400 of an interactive IT kiosk 202, according to some embodiments. FIG. 4a illustrates a front view of an interactive IT kiosk 202. The interactive IT kiosk 202 of FIG. 4a includes some elements similar to that of the interactive IT kiosk 202 illustrated in FIG. 2, such as the frame 206, a platform 208 that can hold a computing device 210, and a display 212. In addition, the interactive IT kiosk 202 may include a video camera 402, ports 404, a cabinet 406 (e.g., that houses one or more computing devices of the interactive IT kiosk 202, such as a computer, a modem, a server, a network switch, a power surge strip, and/or the like), and wheels 408 for mobility. FIG. 4b illustrates a right side view of the interactive IT kiosk 202. As illustrated, the interactive IT kiosk 202 may include a fan 410 to expel air from cabinet 406, or to force air into cabinet 406 for cooling computing devices in the cabinet 406.

As described above, FIGS. 4a and 4b are provided as examples. Other examples are possible, according to some embodiments.

Figure 5A:
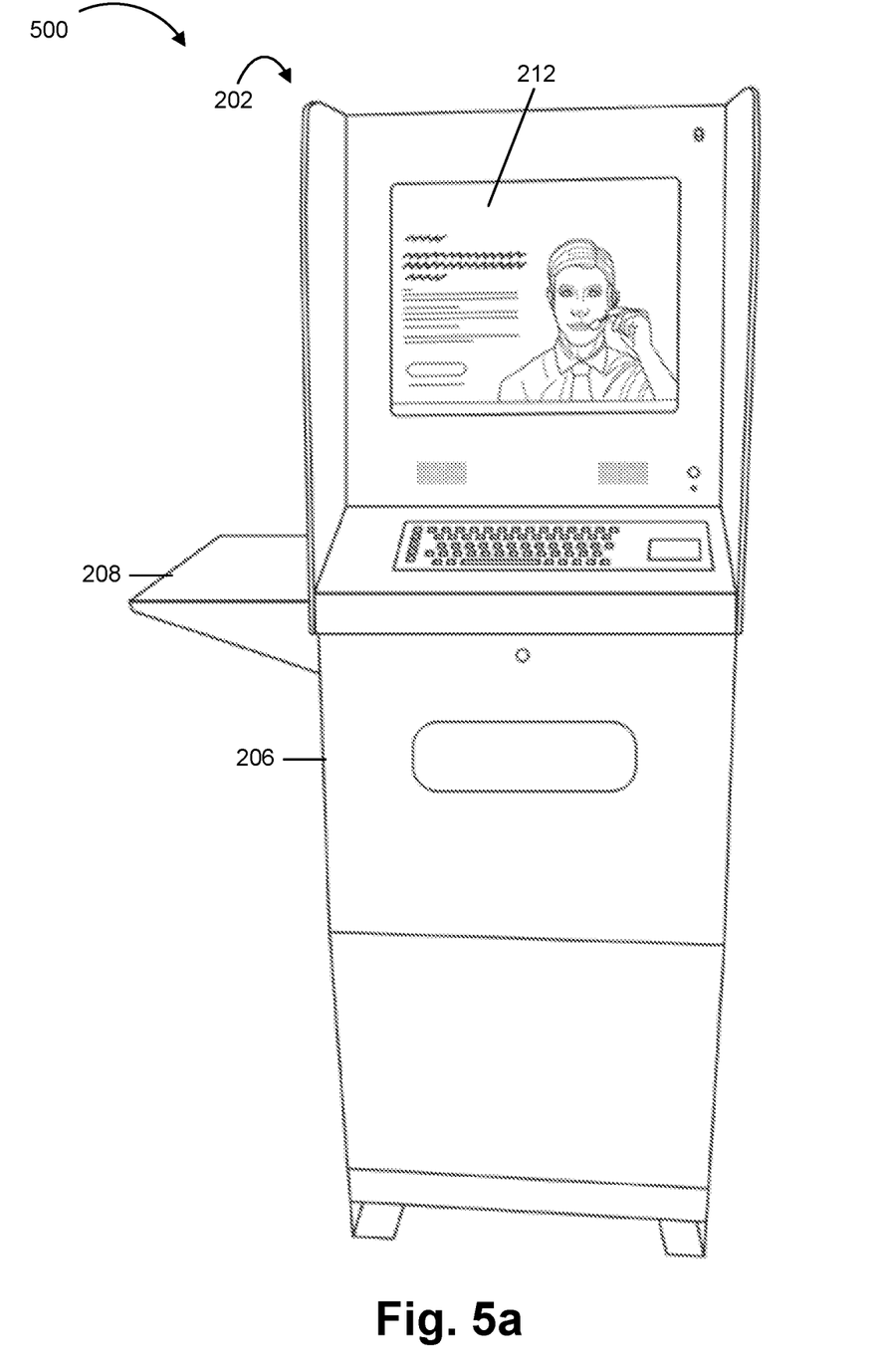
FIGS. 5a and 5b illustrate various views of another example of an interactive IT kiosk, according to some embodiments.
Figure 5B:
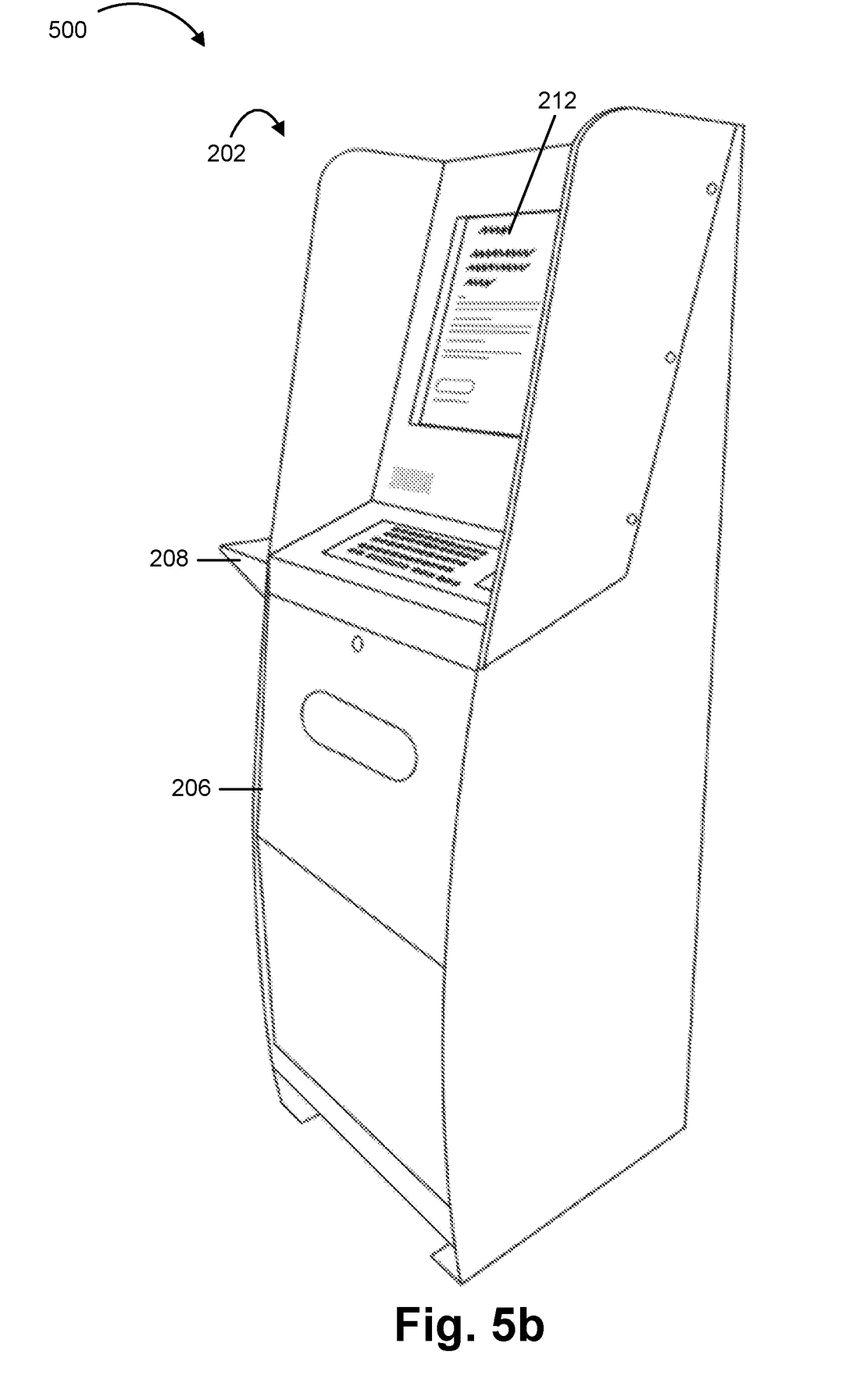

FIGS. 5a and 5b illustrate various views of an example 500 of an interactive IT kiosk 202, according to some embodiments. FIG. 5a illustrates a front view of the interactive IT kiosk 202 and FIG. 5b illustrates a perspective view of the interactive IT kiosk 202. As described above, FIGS. 5a and 5b are provided as examples. Other examples are possible, according to some embodiments.

In some embodiments, the interactive IT kiosk 202 may be modular. For example, various components of the interactive IT kiosk 202 may be swapped in or out of the interactive IT kiosk 202 for various deployment scenarios. Continuing with the previous example, the interactive IT kiosk 202 may be equipped with fenders, visors, plugs on ports, or the like for an outdoor deployment, and those components may be easily removed when the interactive IT kiosk 202 is moved indoors. In some embodiments, the interactive IT kiosk 202 may be deployed outdoors. In this case, the interactive IT kiosk 202 may be configured for drive-up use and may be configured accordingly. For example, input components of the interactive IT kiosk 202, such as a keyboard, may be mounted on an extension of the frame of the interactive IT kiosk 202 so that may be accessible by an occupant of a vehicle.

Figure 6:
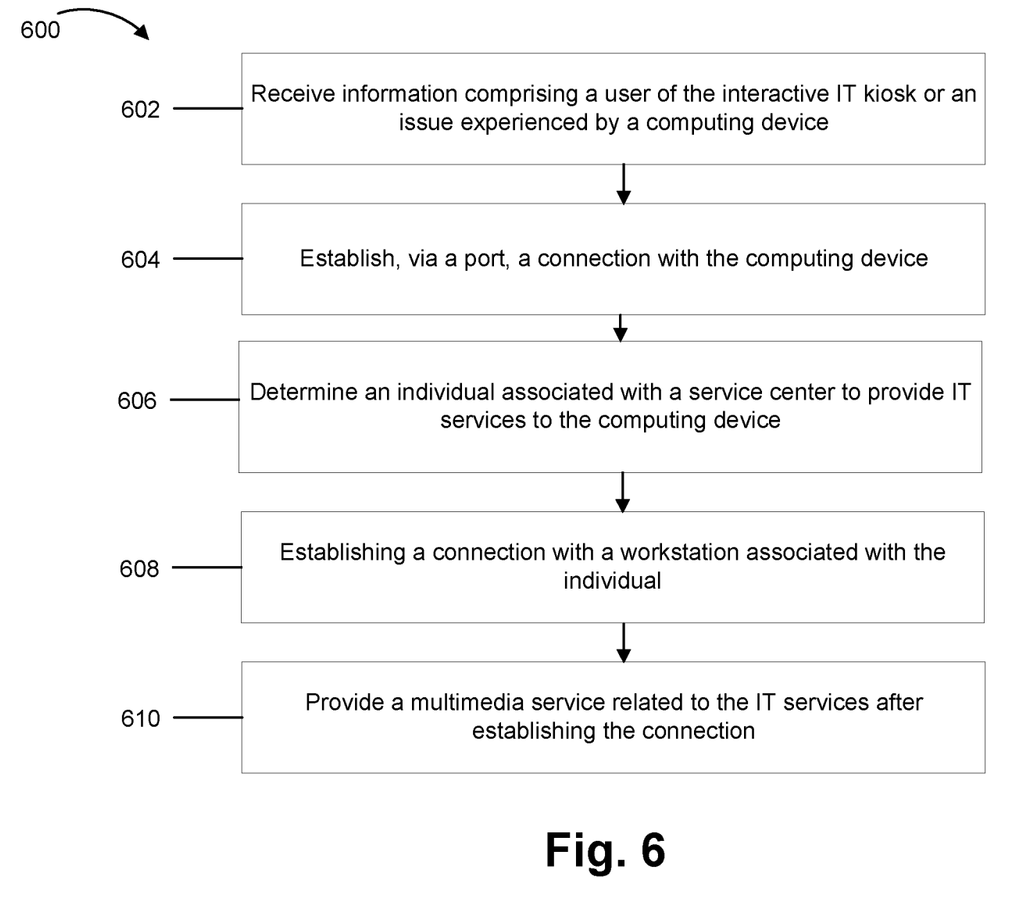
FIG. 6 illustrates an example flow diagram of a method, according to some embodiments.

FIG. 6 illustrates an example flow diagram of a method 600, according to some embodiments. For example, FIG. 6 may illustrate example operations of an interactive IT kiosk (e.g., that apparatus 10 illustrated in, and described with respect to, FIG. 7). Specifically, FIG. 6 may illustrate example operations of interactive IT kiosk 202. Some of the operations illustrated in FIG. 6 may be similar to some operations shown in, and described with respect to, FIGS. 2-5b.

In an embodiment, the method may include, at 602, receiving information comprising a user of the interactive IT kiosk or an issue experienced by a computing device. For example, the interactive IT kiosk may receive the information based on a user of the interactive IT kiosk logging into the interactive IT kiosk via a user interface displayed on a display (e.g., display 212) of the interactive IT kiosk, inputting information to populate one or more fields of the user interface (e.g., name, title, contact information, etc.), or selecting one or more of various options from a menu. Additionally, or alternatively, interactive IT kiosk may receive the information via a microphone (e.g., the user may input information that identifies them or the issue), an electronic drawing pad associated with the interactive IT kiosk (e.g., the user may handwrite the information), a video camera (e.g., the user may record a video where they identify the issues with the computing device 210, may use sign language to input the information, etc.), and/or the like. In some embodiments, depending on the manner in which the interactive IT kiosk receives the information, the interactive IT kiosk may utilize natural language processing, image processing for object detection, and/or the like to parse the information that the user input and to identify relevant portions of the information. In this way, the interactive IT kiosk may receive the information in various manners, which can accommodate different deployment scenarios, user disabilities, etc.

The method may include, at 604, establishing, via a port, a connection with the computing device. For example, a user of the interactive IT kiosk may physically connect the computing device to one or more ports (e.g., a docking station, terminal ends of cables, etc.) and the interactive IT kiosk may establish a data connection with the computing device after physical connection. In some embodiments, the interactive IT kiosk may prompt the user via the computing device to allow permission for the interactive IT kiosk to receive data from the computing device, to perform diagnostics on the computing device, and/or to cause the computing device to perform various operations. After establishing the connection, the interactive IT kiosk may perform a diagnostic test of the computing device via the one or more ports. For example, the interactive IT kiosk may perform a test of software, hardware, and/or the like. The interactive IT kiosk may then process the information received at 602 or a result of the diagnostic test. For example, the interactive IT kiosk may process the information or the result to identify a cause of an issue reported by the user, to confirm the presence of the issue, and/or the like.

In some embodiments, the interactive IT kiosk may perform the processing using an artificial intelligence (AI) or a machine learning (ML) model that is trained to identify issues based on information input to the interactive IT kiosk and a result of the diagnostic test. For example, the interactive IT kiosk may process the information or the result to identify one or more characteristics of the information or the result to determine an issue that is present or a cause of the issue (e.g., to identify particular terms or phrase in the information, data patterns that are part of the result, etc.).

The method may include, at 606, determining an individual associated with a service center to provide IT services to the computing device. For example, based on an issue or a cause of the issue that the interactive IT kiosk identifies, the interactive IT kiosk may determine an individual (e.g., an IT professional) associated with a service center to provide IT services to the computing device. For example, the interactive IT kiosk may identify an individual that is associated with a category of issues that includes the issue identified for the computing device or that is associated with the one or more characteristics identified from the information or the result.

The method may include, at 608, establishing a connection with a workstation associated with the individual. For example, the interactive IT kiosk may send a set of instructions to the workstation, information related to the user or the issue, and/or the like. Additionally, or alternatively, the interactive IT kiosk may send information that can be used to establish a remote access connection to the computing device from the workstation, a multimedia connection with the interactive IT kiosk from the workstation, or a data connection with the computing device from the workstation and via the interactive IT kiosk.

The method may include, at 610, providing a multimedia service related to the IT services after establishing the connection. For example, the kiosk may provide an audio service (e.g., may output audio or receive input of audio), a video service (e.g., may capture video or output video), or an augmented reality service (e.g., may overlay virtual objects on real-world images to help guide the user during IT services).

The interactive IT kiosk may perform other operations related to the operations 602 through 610. For example, the interactive IT kiosk may store logs of the use of the interactive IT kiosk. When a user access the interactive IT kiosk, the interactive IT kiosk may retrieve information from these logs to prepopulate a user interface, to predict an issue with a computing device, and/or the like.

Additionally, or alternatively, the interactive IT kiosk may identify preconfigured solutions to issues and may output those solutions. For example, based on information that the user inputs to the interactive IT kiosk or the result of a diagnostic test, the interactive IT kiosk may identify self-serve technical support instructions for an IT service and may provide those instructions for display or may identify a pre-configured subroutine for automatic performance of an IT service and may execute the subroutine. Continuing with the previous example, the interactive IT kiosk may identify instructions or a subroutine for updating software, restarting software or the computing device, etc.

As described above, FIG. 6 is provided as an example. Other examples are possible according to some embodiments.

Figure 7:
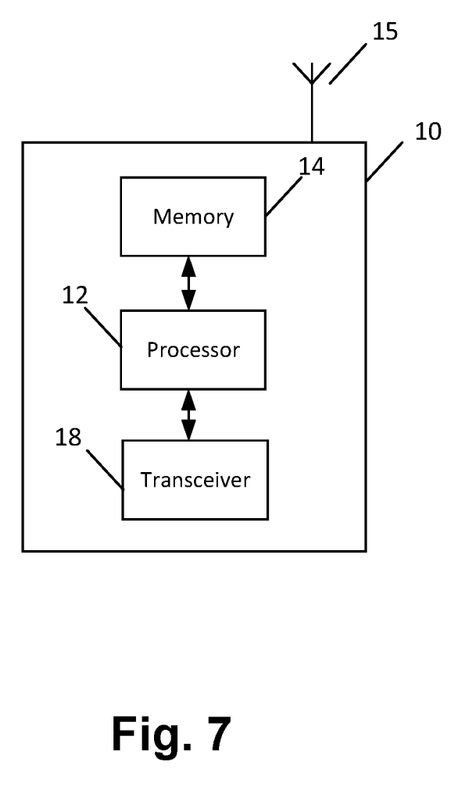
FIG. 7 illustrates an example block diagram of an apparatus, according to an embodiment.

FIG. 7 illustrates an example of an apparatus 10 according to an embodiment. In an embodiment, apparatus 10 may be a node, host, or server in a communications network or serving such a network. For example, apparatus 10 may be computing device (e.g., a computing device associated with a workstation, computing device 210, or a server, such as a laptop or desktop computer, a mobile phone, a tablet, or a wearable device), an interactive IT kiosk (e.g., interactive IT kiosk 202), a computing device of the interactive IT kiosk (e.g., a network switch, a computer, or a display, such as display 212), and/or the like. One or more apparatuses 10 may be connected via a wired network, a wireless network, or a combination of wired and wireless networks.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a computing device, an interactive IT kiosk, or a computing device of the interactive IT kiosk.

According to certain embodiments, apparatus 10 may be controlled by memory 14 and processor 12 to perform the functions associated with any of the embodiments described herein, such as some operations illustrated in, or described with respect to, FIGS. 2-6. For instance, apparatus 10 may be controlled by memory 14 and processor 12 to perform the method of FIG. 6.

In some embodiments, an apparatus (e.g., apparatus 10) may include means for performing a method or any of the variants discussed herein, e.g., a method described with reference to FIG. 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is a reduction in downtime of computing devices due to computing issues. Other example benefits of some embodiments include an effective, efficient, and budget-friendly complement to, or replacement of, traditional desk-side IT services and remote IT services, provisioning of free-standing support portals available in a variety of deployment scenarios, such as high-traffic organization spaces, a one-stop access to multiple levels of technical support, and combined remote and concierge support service. Another example benefit of the interactive IT kiosk 202 includes access to a mobile computing device that is otherwise inaccessible by other remote access solutions, because the mobile computing device has, e.g., defective network hardware and/or Internet/network connections. Other example benefits of some embodiments include anytime assistance without having to queue an issue ticket, wide deployment of technology support without having to deploy technical support individuals to various locations, and faster response time to computing issues, which may improve satisfaction among employees or other individuals that use computing devices. Accordingly, the use of some example embodiments results in improved functioning of communications networks and their nodes and, therefore constitute an improvement at least to the technological field of information technology services provisioning and remedying of technical issues for computing devices, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single interactive IT kiosk (or elements thereof) equally applies to embodiments that include multiple instances of the interactive IT kiosk (or elements thereof), and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

I claim:

1. A method, comprising:
 receiving, by an interactive information technology kiosk, information comprising a user of the interactive information technology kiosk or one or more issues experienced by one or more computing devices;
 establishing, via one or more ports, one or more connections with the one or more computing devices;
 determining one or more individuals associated with a service center to provide one or more information technology services to the one or more computing devices based at least on the information;
 establishing one or more connections with one or more workstations associated with the one or more individuals;
 providing one or more multimedia services related to the one or more information technology services after establishing the one or more connections; and
 identifying, based on the information, previous information technology services provided to the one or more computing devices, and previous one or more individuals that provided information technology services to the one or more computing devices.

2. The method according to claim 1, further comprising:
 performing one or more diagnostic tests of the one or more computing devices via the one or more ports.

3. The method according to claim 2, further comprising:
 processing the information or one or more results of the one or more diagnostic tests using an artificial intelligence or a machine learning model to identify one or more characteristics of the information or the one or more results of the one or more diagnostic tests.

4. The method according to claim 3, further comprising:
 matching the one or more individuals to the one or more computing devices based on the one or more characteristics of the information or the one or more results.

5. The method according to claim 1, wherein the interactive information technology kiosk comprises at least one of:
 a frame,
 one or more displays,
 one or more video cameras,
 one or more platforms for the computing device,
 one or more microphones, or
 one or more speakers.

6. The method according to claim 1, wherein the one or more computing devices comprise:
 one or more personal computers,
 one or more medical devices,
 one or more industrial tools, or
 one or more elements of a vehicle or a machine.

7. The method according to claim 1, wherein the one or more ports comprise at least one of:
 one or more universal serial bus ports,
 one or more Ethernet ports, or
 one or more multiple pin ports.

8. The method according to claim 1, wherein the one or more multimedia services comprise at least one of:
 one or more audio services,
 one or more video services, or
 one or more augmented reality services.

9. The method according to claim 1, wherein the receiving of the information comprises:
 receiving the information via at least one of:
 one or more user interfaces,
 one or more microphones,
 one or more video cameras, or
 one or more electronic drawing pads.

10. An interactive information technology kiosk, comprising:
   at least one processor; and
   at least one memory comprising computer program code,
   the at least one memory and the computer program code are configured to, with the at least one processor, cause the interactive information technology kiosk at least to:
   receive information comprising a user of the interactive information technology kiosk or one or more issues experienced by one or more computing devices;
   establish, via one or more ports, one or more connections with the one or more computing device;
   determine one or more individuals associated with a service center to provide one or more information technology services to the one or more computing devices based at least on the information;
   establish one or more connections with one or more workstations associated with the one or more individuals;
   provide one or more multimedia services related to the one or more information technology services after establishing the one or more connections; and
   identify, based on the information, previous information technology services provided to the one or more computing devices, and previous one or more individuals that provided information technology services to the one or more computing devices.

11. The interactive information technology kiosk according to claim 10, wherein the at least one memory and the computer program code are configured to, with the at least one processor, further cause the interactive information technology kiosk at least to:
   perform one or more diagnostic tests of the one or more computing devices via the one or more ports.

12. The interactive information technology kiosk according to claim 11, wherein the at least one memory and the computer program code are configured to, with the at least one processor, further cause the interactive information technology kiosk at least to:
   process the information or one or more results of the one or more diagnostic tests using an artificial intelligence or a machine learning model to identify one or more characteristics of the information or the one or more results of the one or more diagnostic tests.

13. The interactive information technology kiosk according to claim 12, wherein the at least one memory and the computer program code are configured to, with the at least one processor, further cause the interactive information technology kiosk at least to:
   match the one or more individuals to the one or more computing devices based on the one or more characteristics of the information or the one or more results.

14. The interactive information technology kiosk according to claim 10, wherein the interactive information technology kiosk further comprises at least one of:
   a frame,
   one or more displays,
   one or more video cameras,
   one or more platforms for the computing device,
   one or more microphones, or
   one or more speakers.

15. The interactive information technology kiosk according to claim 10, wherein the one or more computing devices comprise:
   one or more personal computers,
   one or more medical devices,
   one or more industrial tools, or
   one or more elements of a vehicle or a machine.

16. The interactive information technology kiosk according to claim 10, wherein the one or more ports comprise at least one of:
   one or more universal serial bus ports,
   one or more Ethernet ports, or
   one or more multiple pin ports.

17. The interactive information technology kiosk according to claim 10, wherein the one or more multimedia services comprise at least one of:
   one or more audio services,
   one or more video services, or
   one or more augmented reality services.

18. The interactive information technology kiosk according to claim 10, wherein the at least one memory and the computer program code are configured to, with the at least one processor, further cause the interactive information technology kiosk, when receiving the information, at least to:
   receive the information via at least one of:
      one or more user interfaces,
      one or more microphones,
      one or more video cameras, or
      one or more electronic drawing pads.

19. An interactive information technology kiosk, comprising a set of components comprising:
   a frame,
   at least one processor,
   at least one memory comprising computer program code,
   one or more ports,
   one or more displays,
   one or more video cameras,
   one or more platforms for the computing device,
   one or more microphones, and
   one or more speakers, wherein the set of components is configured to perform at least the following:
   receive information comprising a user of the interactive information technology kiosk or one or more issues experienced by one or more computing devices;
   determine one or more individuals associated with a service center to provide one or more information technology services to the one or more computing devices based at least on the information; and
   identifying, based on the information, previous information technology services provided to the one or more computing devices, and previous one or more individuals that provided information technology services to the one or more computing devices.

20. The interactive information technology kiosk according to claim 19, wherein the set of components is further configured to perform at least the following:
   establish, via the one or more ports, one or more connections with the one or more computing devices after receiving the information;
   establish one or more connections with one or more workstations associated with the one or more individuals after determining the one or more individuals; and
   provide one or more multimedia services related to the one or more information technology services after establishing the one or more connections.

* * * * *